UNITED STATES PATENT OFFICE.

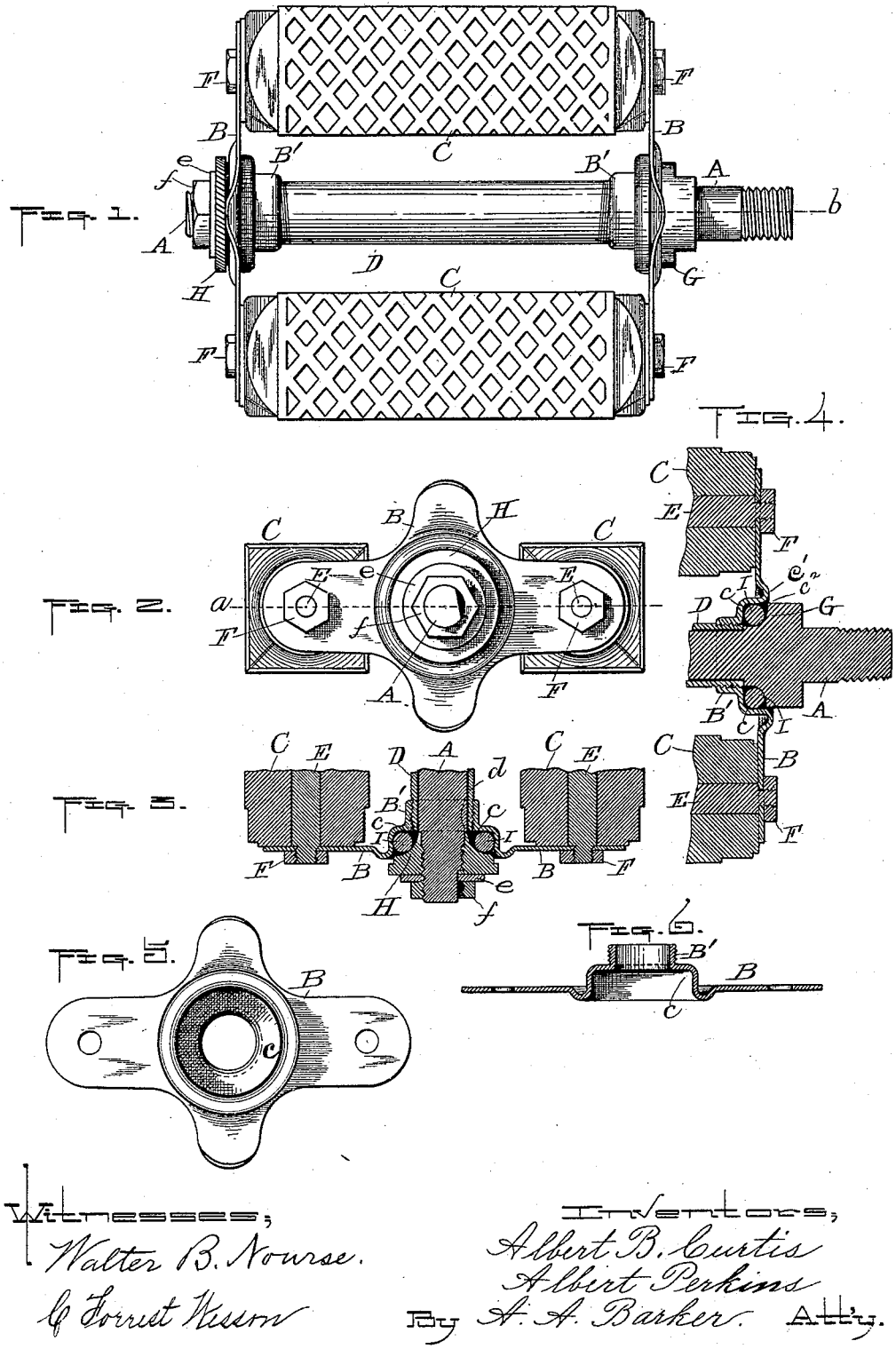

ALBERT B. CURTIS, OF WORCESTER, AND ALBERT PERKINS, OF CHICOPEE, MASSACHUSETTS; SAID PERKINS ASSIGNOR TO SAID CURTIS.

VELOCIPEDE-TREADLE.

SPECIFICATION forming part of Letters Patent No. 471,075, dated March 15, 1892.

Application filed June 13, 1891. Serial No. 396,097. (No model.)

*To all whom it may concern:*

Be it known that we, ALBERT B. CURTIS, of Worcester, in the county of Worcester and State of Massachusetts, and ALBERT PERKINS, of Chicopee, in the county of Hampden and State of Massachusetts, have invented certain new and useful Improvements in Velocipede-Treadles; and we do hereby declare that the following is a full, clear, and exact description thereof, reference being had to the accompanying drawings, forming a part of this specification, and in which—

Figure 1 represents a top or plan view of a velocipede-treadle embodying our improvements. Fig. 2 is an end view thereof. Fig. 3 is a central longitudinal section through the outer end of the treadle, taken on line $a$, Fig. 2. Fig. 4 is a similar view of the opposite or inner end, taken on line $b$, Fig. 1. Fig. 5 is a detached plan view of one of the treadle end bearings, and Fig. 6 is a central longitudinal section thereof.

Our invention consists of certain improvements in the construction of the treadle-bearings of velocipedes, the same being more particularly designed for use on bicycles and tricycles.

In order that others may better understand the nature and purpose of our said improvements, we will now proceed to describe the same more in detail.

In the drawings, A represents the treadle-axle.

B B are the end bearings, which carry the rubber foot-rests C C, and which are connected together by the sleeve D, fitted over the axle between said bearings. The sleeve and bearings are secured together by forming threads on the ends of said sleeve and on the inner hubs B' of the bearings and screwing one into the other, as is shown in Figs. 3 and 4. We prefer to form external threads on the ends of the sleeve and internal threads on the hubs B', as indicated in said figures for said purpose; but, if preferred, said construction may be reversed in practice.

In Fig. 6 we have shown one of the hubs of the bearings provided with external threads in accordance with said modified construction. Between the outer ends of the bearings B B are secured the rubber foot-rests C C, previously alluded to, the same being held in place and the parts fastened together, as usual, by means of the longitudinal bolts E and nuts F. Outside of the bearings B B, in recesses or pockets $c$, formed in the hubs thereof between said hubs and the ball-bearing cones or nuts G H are placed the usual friction-balls I, upon which said treadle-bearings B B turn. The cone G is in this instance shown as being formed on the axle, while the cone H is in the form of a nut, which may be turned onto the threaded outer end of the axle against a shoulder $d$, formed on said axle. It is locked after having been turned up into position by means of a washer $e$ and lock-nut $f$. Said result may be facilitated by cutting away the side of the axle and making the opening in the washer correspondingly shaped to prevent its turning thereon, as in other similar cases. The sleeve D is made larger than the axle, and turns independent thereof with the bearings B B. Said bearings are in practice made of the shape shown in the drawings, with the threaded inner hubs B' and recesses or pockets $c$ from sheet metal, cut, punched, and compressed into the desired shape by means of ordinary cutting, punching, and compressing mechanism provided with suitable dies for the purpose, the sheet-metal blank or form being cut and the holes punched simultaneously with said compressing operation or independent thereof, as desired. In addition to the curves or bends formed in the sheet-metal bearings B B to produce the hubs B' B' and sockets $c c$, they are also bent laterally in an opposite direction from said hubs to produce the annular lateral projections or ribs $c'$ $c'$ for the purpose of strengthening or stiffening the bearings, as well as to form a dust-guard at each end of the treadle, said projections being adapted to bear against the corners $c^2$ of the cones G H to close the friction-ball sockets or pockets $c$ at said points, as is shown in the drawings. By thus making the bearings it will at once be obvious to those skilled in the art to which this invention appertains that they may be manufactured very cheaply, the only machine-work required upon the bearings, after having been thus stamped and punched out, being to cut the threads upon the ends of the sleeve and hubs of the bearings.

We do not limit ourselves to the special shape or contour into which the sheet metal is cut and compressed in forming said bearings to carry out the result described, nor to the size and position of the holes punched therein.

We are aware that it is not broadly new to make treadle-bearings of sheet metal compressed into the desired shape, and therefore limit our invention to the special construction and arrangement herein set forth and claimed.

What we claim as new, and desire to secure by Letters Patent, is—

In a velocipede-treadle, the end bearings B B, made from a single piece of sheet metal cut, punched, and compressed to form supports for the foot-rest bolts E E, the annular strengthening-ribs and dust-guards $c'\ c'$, adapted to bear against the corners $c^2\ c^2$ of friction-cones G H, the annular recesses $c\ c$, formed by a curved bend in the plate to receive the friction-balls I, and the inwardly-projecting threaded hubs B' B', substantially as described, in combination with the threaded sleeve D, interposed between said bearings B B, and to the ends of which are screwed the hubs B' B' thereof, the axle A, over which said sleeve is fitted, the friction-cones G H on the ends of said axle, the friction-balls I, interposed between said friction-cones and the bearings B B in their recesses $c\ c$ aforesaid, and means for holding the friction-cones in position longitudinally, substantially as and for the purpose set forth.

ALBERT B. CURTIS.
     ALBERT PERKINS.

Witnesses:
 HENRY N. LYON,
 SIDNEY SANDERS.